United States Patent
Pocai

(12) United States Patent — Pocai
(10) Patent No.: US 6,931,798 B1
(45) Date of Patent: Aug. 23, 2005

(54) MODULAR PROTECTION DEVICE FOR UNDERPINNING

(76) Inventor: Robert S. Pocai, P.O. Box 171, Lost Creek, KY (US) 41348

( * ) Notice: Subject to any disclaimer, the term of this patent is extended or adjusted under 35 U.S.C. 154(b) by 0 days.

(21) Appl. No.: 10/653,181

(22) Filed: Sep. 3, 2003

(51) Int. Cl.$^7$ .............................................. E02D 27/00
(52) U.S. Cl. .................... 52/102; 52/DIG. 3; 52/716.1; 52/776; 52/169.1; 52/169.9; 52/585.1; 52/699; 52/293.3; 52/726.1; 47/32.4; 47/33; 404/4.7; 256/1; 256/32; 256/19; 256/20
(58) Field of Search ........................... 52/102, DIG. 3, 52/716.1, 776, 169.1, 169.9, 585.1, 699, 52/293.3, 726.1; 47/32.4, 33; 404/4, 7; 256/1, 256/32, 19, 20

(56) References Cited

U.S. PATENT DOCUMENTS

| | | | | |
|---|---|---|---|---|
| 3,619,944 A | * | 11/1971 | Matvey | 47/33 |
| 3,782,680 A | * | 1/1974 | Hopkins | 249/188 |
| 4,401,705 A | * | 8/1983 | Ewert | 428/131 |
| 4,663,883 A | * | 5/1987 | Hilliard et al. | 47/33 |
| 4,809,459 A | | 3/1989 | Brylla et al. | |
| 4,903,947 A | | 2/1990 | Groves | |
| 4,964,619 A | | 10/1990 | Glidden, Jr. | |
| 5,039,065 A | | 8/1991 | Denton | |
| 5,178,369 A | * | 1/1993 | Syx | 256/32 |
| D353,214 S | * | 12/1994 | DeGroot | D25/164 |
| 5,377,447 A | * | 1/1995 | Fritch | 47/33 |
| 5,421,118 A | * | 6/1995 | Bauer | 47/33 |
| 5,452,541 A | * | 9/1995 | DeMaio | 47/33 |
| 5,544,445 A | * | 8/1996 | Mantilla | 47/33 |
| 5,671,571 A | * | 9/1997 | Braun | 52/211 |
| 5,857,288 A | | 1/1999 | Wiste | |
| 5,930,947 A | * | 8/1999 | Eckhoff | 47/33 |
| 6,230,451 B1 | * | 5/2001 | Stoller | 52/169.1 |
| 6,379,078 B1 | * | 4/2002 | Zwier | 404/7 |
| 6,393,788 B1 | * | 5/2002 | Flores | 52/365 |
| 6,527,255 B2 | * | 3/2003 | O'Berry et al. | 256/1 |
| 6,625,925 B1 | * | 9/2003 | Foster | 47/33 |
| 6,702,247 B2 | * | 3/2004 | Takagi | 249/189 |

* cited by examiner

Primary Examiner—Carl D. Friedman
Assistant Examiner—Christy M. Green

(57) ABSTRACT

A modular protection device for underpinning for protecting underpinning from lawn care equipment includes an elongated trough having a first end and a second end. The first and second ends are open. The elongated trough includes a bottom wall, a front wall and a back wall each extending between the first and second ends. The trough has an open top side and defines a channel for selectively receiving a bottom edge of the mobile home underpinning. A foot is attached to and extends outwardly from the front wall. A plurality of troughs is provided. A coupler assembly for selectively couples a pair of the troughs together.

4 Claims, 4 Drawing Sheets

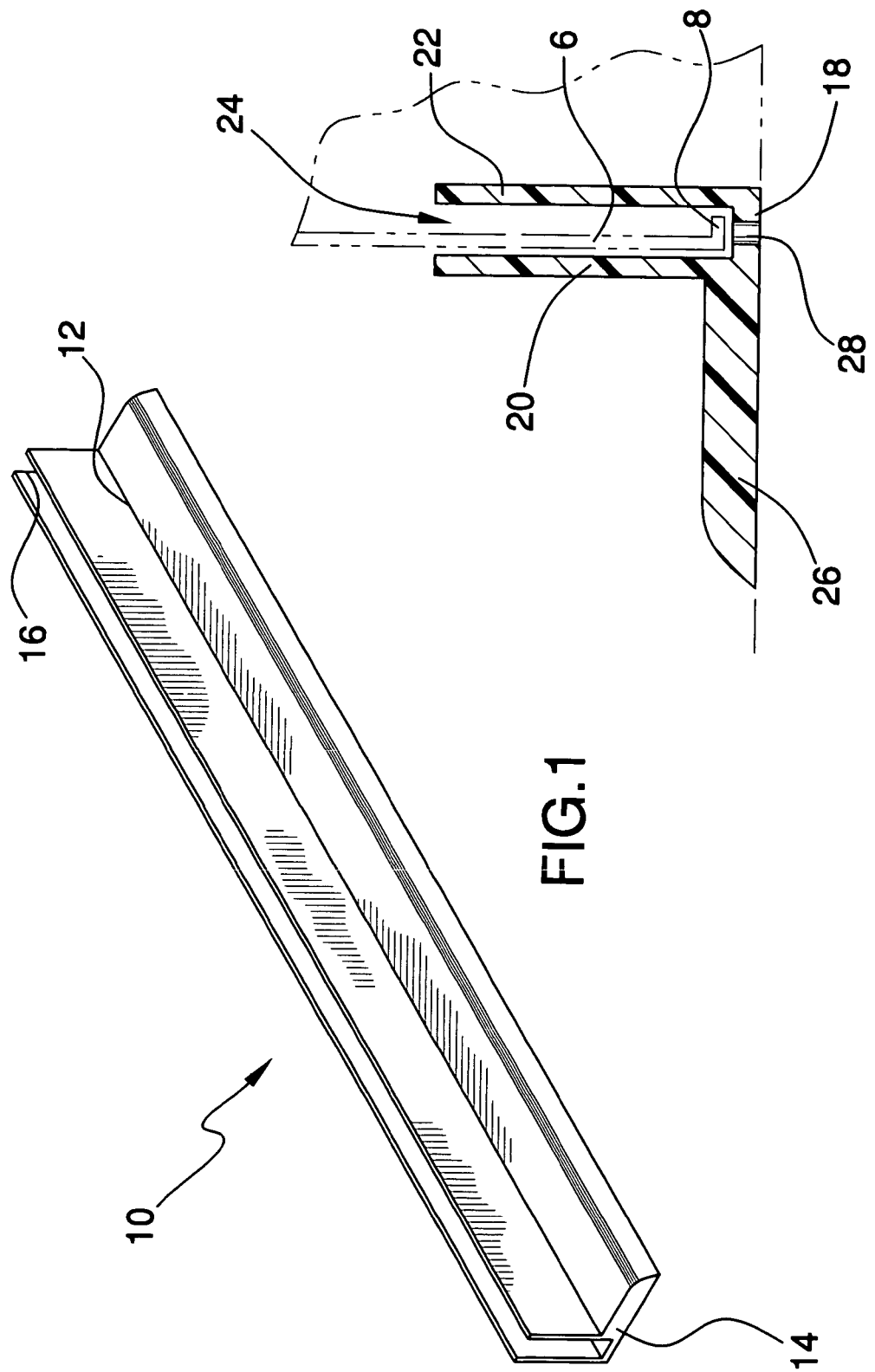

MODULAR PROTECTION DEVICE FOR UNDERPINNING

BACKGROUND OF THE INVENTION

1. Field of the Invention

The present invention relates to siding protection devices and more particularly pertains to a new siding protection device for selectively receiving underpinning siding of a mobile home to protect the underpinning from lawn care equipment and for retaining plant growth in a spaced relationship with respect to the underpinning.

2. Description of the Prior Art

The use of siding protection devices and fencing devices is known in the prior art. While these devices fulfill their respective, particular objectives and requirements, the need remains for a device that is specifically designed for the protection of mobile home underpinnings. This type of siding is used as a skirt to block visual access below a mobile home and to provide a more permanent appearance to the structure. The owners of mobile home parks often require these underpinnings and their use can cause problems with weed control because the underpinnings do not extend into the ground surface. Therefore, a device is needed that protects the underpinnings from ground clearing lawn care equipment such as weed cutters and lawn mowers while also aiding the prevention of growth of weeds and other plant materials directly adjacent to and abutting the underpinnings.

SUMMARY OF THE INVENTION

The present invention meets the needs presented above by comprising an elongated trough having a first end and a second end. The first and second ends are open. The elongated trough includes a bottom wall, a front wall and a back wall each extending between the first and second ends. The trough has an open top side and defines a channel for selectively receiving a bottom edge of mobile home underpinning. A foot is attached to and extends outwardly from the front wall. A plurality of troughs is provided. A coupler assembly for selectively couples a pair of the troughs together. The trough protects the bottom portion of the underpinnings from damage that can be caused by weed cutters while the foot prevents weeds from growing adjacent to the underpinning.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a modular protection device for underpinning according to the present invention.

FIG. 2 is a schematic cross-sectional view of the present invention showing the underpinning positioned therein.

DESCRIPTION OF THE PREFERRED EMBODIMENT

Figure 3:
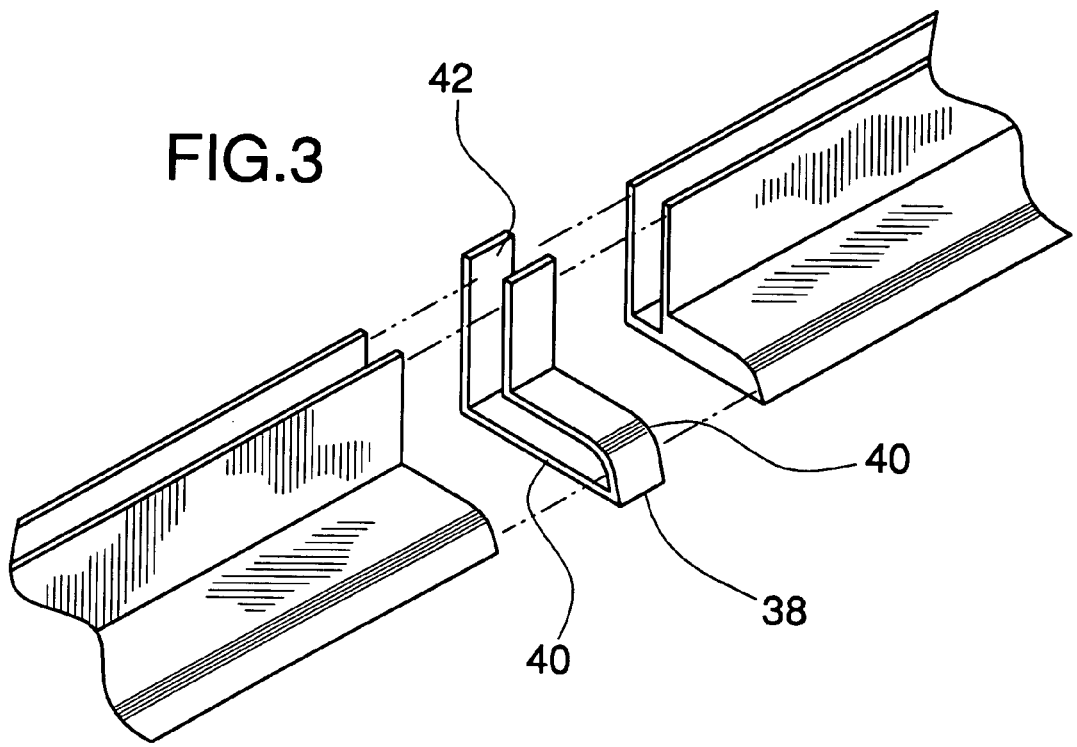
FIG. 3 is a schematic perspective view of the sleeve of the present invention.
Figure 4:
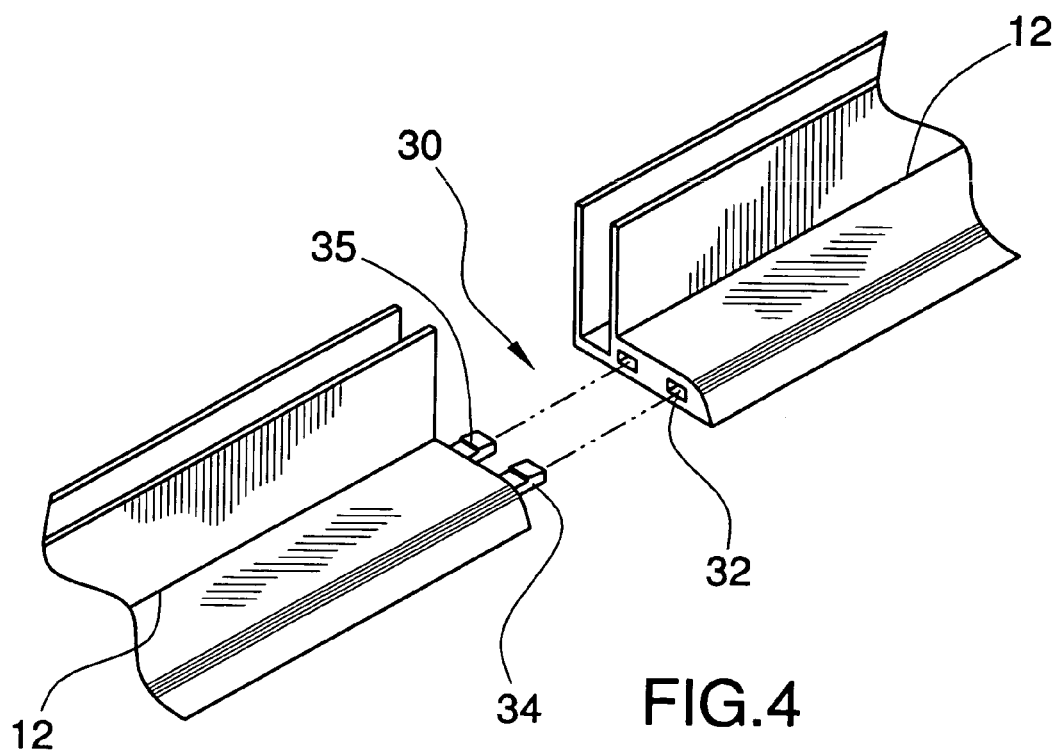
FIG. 4 is a schematic perspective view of the coupler assembly of the present invention.
Figure 5:
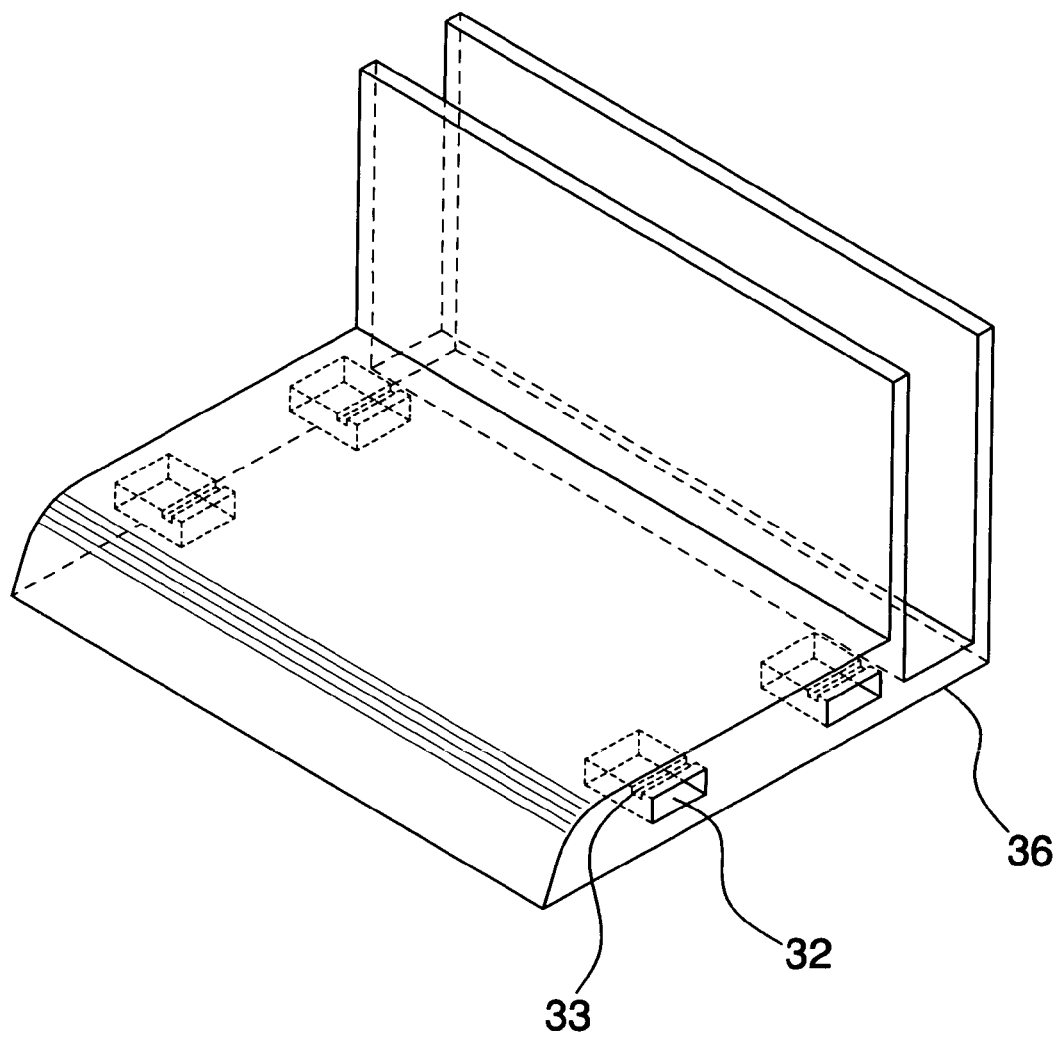
FIG. 5 is a schematic perspective view of an alternative coupler of the present invention.

With reference now to the drawings, and in particular to FIGS. 1 through 6 thereof, a new siding protection device embodying the principles and concepts of the present invention and generally designated by the reference numeral 10 will be described.

As best illustrated in FIGS. 1 through 6, the modular protection device for underpinning 10 generally comprises an elongated trough 12 having a first end 14 and a second end 16 that are each open. The trough 12 is formed by a bottom wall 18, a front wall 20 and a back wall 22 each extending between the first 14 and second 16 ends. The trough 12 has an open top side that defines a channel 24 for selectively receiving a bottom edge 8 of a mobile home underpinning 6. A foot 26 is attached to and extends outwardly from the front wall 20. The foot 26 extends between the first 14 and second 16 ends and is positioned adjacent to the bottom wall 18. Preferably, the front 20 and back 22 walls each have a height generally between 1 inch and 2 inches, the foot 26 extends outwardly from the front wall 20 generally between 4 inches and 6 inches, and each of the troughs 12 has a length from the first end 14 to the second end 16 generally between 4 feet and 8 feet. The bottom wall 18 preferably has a plurality of openings 28 extending therethrough. The openings 28 allow for drainage of fluids caught in the trough 12 and may also be used for receiving anchors to hold the trough 12 on a ground surface. Ideally, there is a plurality of troughs 12 provided so that they may be extended around a perimeter of a mobile home. The troughs 12 may have bends therein for receiving underpinnings 6 positioned on a corner of the mobile home.

A coupler assembly 30 selectively couples a pair of the troughs 12 together. This allows multiple troughs 12 to be attached together to extend along the perimeter of the mobile home. The coupler assembly 30 includes at least one female mating section 32 extending into each of the first ends 14 and at least one male mating section 34 that is attached to and extends outwardly from each of the second ends 16. Preferably, there is a pair of male 34 and female 32 sections provided for each of the troughs 12. The male 34 and female 32 mating sections are positioned such that the channels 24 of aligned troughs 12 are aligned when the male 34 and female 32 mating sections are coupled together. The female mating sections 32 preferably include a downwardly extending catch 33 and the male mating sections 34 each preferably including an upwardly extending catch 35 for frictionally engaging the downwardly extending catch 33. The catches 33, 35 selectively lock the male 34 and female 32 mating sections together. Alternatively, central couplers 36 may be furnished which comprise truncated troughs having female mating sections 32 on both ends which will receive male couplers 34 attached to both of the first 14 and second 16 ends of the troughs 12.

Figure 6:
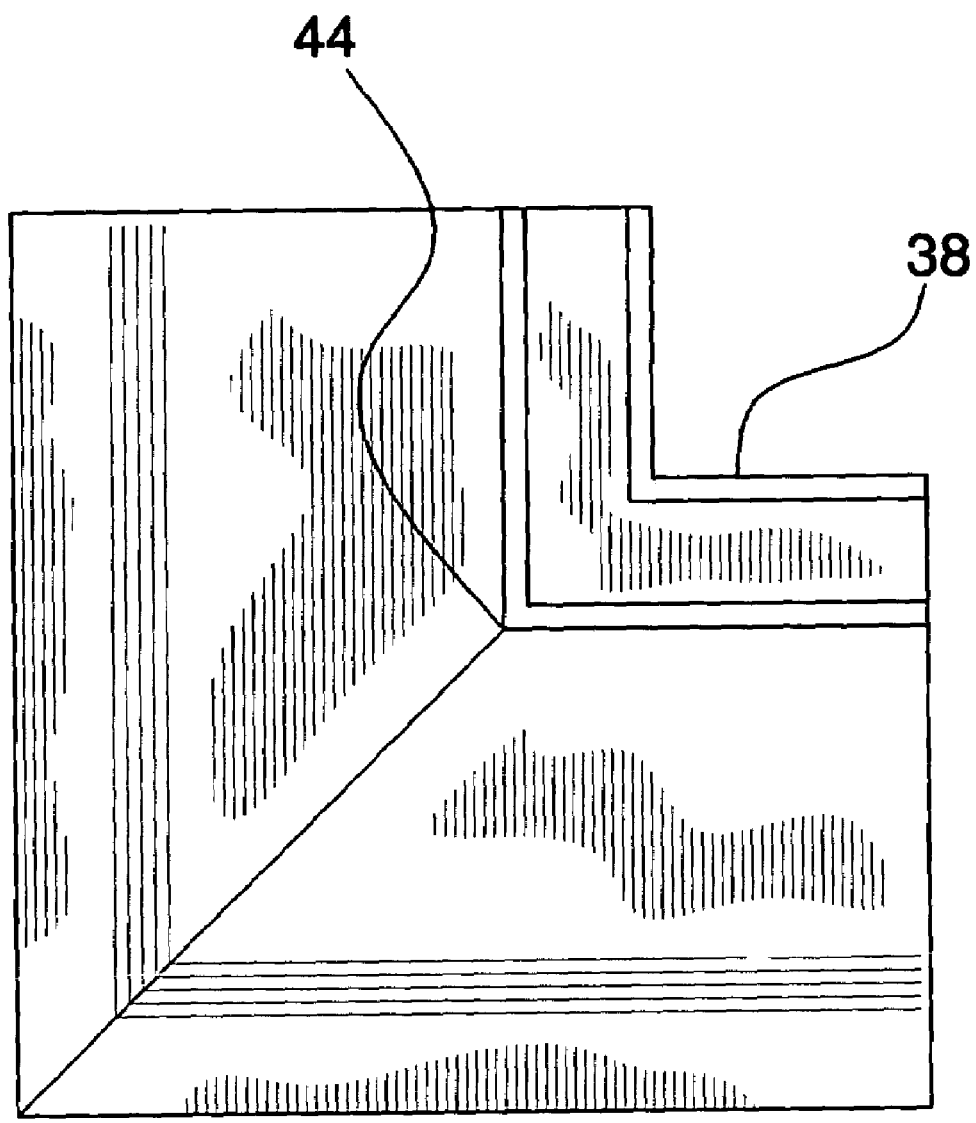
FIG. 6 is a schematic top view of a sleeve of the present invention.

An alternative coupler, shown in FIG. 3, includes a sleeve 38 having a shape and a pair of open sides 40 for removably receiving an adjacently positioned pair of first 14 and second 16 ends. The sleeve 38 has an open top side 42 alignable with the channel 24. To use this coupler, the ends of the troughs 12 are extended into the sleeve 38 so that the ends 14, 16 of the troughs 12 are covered. A variation of this design includes a sleeve 38 has a bend 44 therein. The bend 44 is generally equal to 90 degrees such that a pair of troughs 12 may be coupled together in an angular relationship to each other. The bend 44 may be positioned so that the sleeve 38 is formed for an inner corner or an outer corner. The sleeve 38 shown in FIG. 6 is formed for an outer corner.

In use, the underpinnings 6, or lower siding, of a mobile home are extended into the troughs 12 and the troughs 12 connected together with one of the couplers 30, 38 shown in order to form a finished looking appearance. The troughs 12 protect the underpinnings 6 from garden tools such as weed cutters and keep the weeds spaced from the underpinnings to provide a cleaner and more landscaped look.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A modular protection device for selectively receiving and protecting mobile home underpinning, said device comprising:

an elongated trough having a first end and a second end, said first and second ends being open, said elongated trough including a bottom wall, a front wall and a back wall each extending between the first and second ends, said trough having an open top side defining a channel for selectively receiving a bottom edge of the underpinning, a foot being attached to and extending outwardly from said front wall, wherein a plurality of troughs are provided;

a coupler assembly for selectively coupling a pair of said troughs together, said coupler assembly including at least one female mating section extending into each of the said first ends and at least one male mating section being attached to and extending outwardly from each of the second ends, said male and female mating sections being positioned such that said channels are aligned when said male and female mating sections are coupled together; and, said female mating sections each include a downwardly extending catch and said male mating sections each include an upwardly extending catch for frictionally engaging said downwardly extending catch.

2. The modular protection device of claim 1, wherein said front and back walls each have a height generally between 1 inch and 2 inches, said foot extending outwardly from said front wall generally between 4 inches and 6 inches.

3. The modular protection device of claim 1, wherein said bottom wall has a plurality of openings extending therethrough, wherein there are a plurality of troughs.

4. A modular protection device for selectively receiving and protecting mobile home underpinning, said device comprising:

an elongated trough having a first end and a second end, said first and second ends being open, said elongated trough including a bottom wall, a front wall and a back wall each extending between said first and second ends, said trough having an open top side defining a channel for selectively receiving a bottom edge of the underpinning, a foot being attached to and extending outwardly from said front wall, said foot extending between said first and second ends and being positioned adjacent to said bottom wall, said front and back walls each having a height generally between 1 inch and 2 inches, said foot extending outwardly from said front wall generally between 4 inches and 6 inches, each of said troughs having a length from said first end to said second end generally between 4 feet and 8 feet, said bottom wall having a plurality of openings extending therethrough, wherein there are a plurality of troughs; and a coupler assembly for selectively coupling a pair of said troughs together, said coupler assembly including at least one female mating section extending into each of said first ends and at least one male mating section being attached to and extending outwardly from each of said second ends, said male and female mating sections being positioned such that said channels are aligned when said male and female mating sections are coupled together, said female mating sections including a downwardly extending catch, said male mating sections each including an upwardly extending catch for frictionally engaging said downwardly extending catch.

* * * * *